United States Patent Office 3,192,010
Patented June 29, 1965

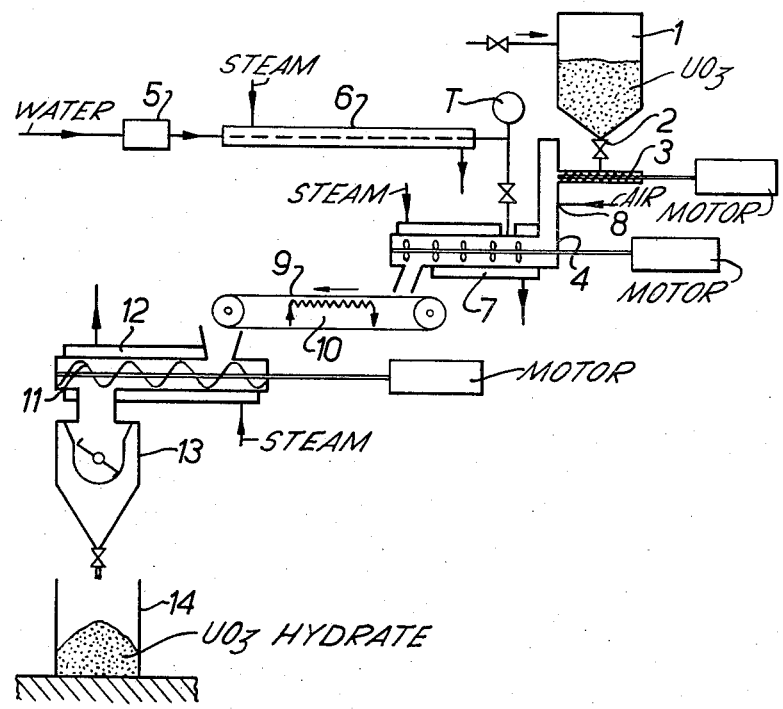

3,192,010
PRODUCTION OF URANIUM DIOXIDE
James Elgie Lloyd and Lionel Hepworth Brooks, Preston, England, assignors to United Kingdom Atomic Energy Authority, London, England
Filed June 1, 1962, Ser. No. 199,505
Claims priority, application Great Britain, June 13, 1961, 21,378/61
3 Claims. (Cl. 23—14.5)

This invention relates to the production of uranium dioxide. It is particularly concerned with the production of uranium dioxide in a form which is highly reactive towards gaseous hydrogen fluoride and is capable of being converted quantitatively to uranium tetrafluoride thereby at high temperatures.

Some forms of uranium dioxide are highly reactive towards hydrogen fluoride, by virtue of the high surface area and particular texture of their particles, while others are very unreactive. In particular, uranium trioxide produced by the thermal de-nitration of uranyl nitrate by spraying a concentrated aqueous solution of this salt into a heated fluidized bed of uranium trioxide yields on reduction with hydrogen a uranium dioxide which is very unreactive; periods of several hours are required for its conversion to uranium tetrafluoride by hydrogen fluoride at 450° C. This is partly due to the comparatively low surface area of the "fluidised bed" uranium trioxide (of the order of 0.1 m.$^2$/g.) from which the uranium dioxide was derived.

It is already known to enchance the reactivity of uranium trioxide by adding sulphate, in amounts up to about 0.1% by weight, to uranyl nitrate solution from which the uranium trioxide is produced by concentration and calcination, but the introduction of sulphate gives rise to corrosion problems and its avoidance would be an advantage.

It has also been known to produce uranium dioxide of enhanced reactivity from "fluidised bed" uranium trioxide by first hydrating the uranium trioxide by immersing it in water at about 65° C., dehydrating the hydrate so formed, and then reducing the dehydrated material with hydrogen. However, production of hydrated uranium trioxide by this method involves the separate subsequent operations of setting, decantation, filtering, drying, and recovery of uranium from the filtrate, which makes the method unattractive from a production point of view because of the number of operations involved. Furthermore the rate of hydration by this method is slow, involving a period of the order of 24 hours which again is unattractive.

According to the invention, a method of producing uranium dioxide having a high reactivity towards hydrogen fluoride comprises hydrating uranium trioxide by mixing it in powder form with water at about 80° C., the amount of water being slightly in excess of the stoichiometric amount required for forming uranium trioxide dihydrate, maintaining the paste so formed at about 80° C. until a dry granular solid of hydrated uranium trioxide is produced, and dehydrating and reducing the hydrated uranium trioxide to give uranium dioxide.

The uranium trioxide powder is preferably mixed with the water at high speed so as to bring the water into intimate contact with the particles of uranium trioxide.

A process for carrying out the invention will now be described by way of example with reference to the single figure of the accompanying drawing which is a diagrammatic view of apparatus for performing the process. Uranium trioxide prepared by spraying concentrated uranyl nitrate into a fluidised bed of the same uranium trioxide at 250 to 350° C. is held in a hopper 1 having a control valve 2 and is fed therefrom by a screw feeder 3 to a high speed paddle mixer 4 in which it is mixed at a rate of 10 to 50 kg. UO$_3$ per hour under slurry conditions with an amount of water in excess by 0.7 to 1.0 mole of the stiochiometric amount required to produce uranium trioxide dihydrate, the water being metered by a metering pump 5 and heated to about 80° C. in a steam chamber 6 before being introduced to the mixer 4 which has a steam jacket 7 by means of which the mixer is maintained at about 80° C., thereby producing a paste of homogeneous composition. The high speed mixing tends to break up the particles of uranium trioxide giving a larger surface area and a high rate a hydration. A period of about 20 minutes is typical. The mixer 4 is provided with an air purge at 8 for transferring a batch of paste to a belt conveyor 9 provided with a steam heater 10. The paste undergoes drying on the belt conveyor 9 as it is fed to a screw conveyor 11, in which it is aged at about 80° C., the screw conveyor 11 having a steam jacket 12, the speed of rotation of the screw (for example 10 revs. per hour) and/or the length of the conveyor (for example 4 feet) being chosen so that the outgoing material is in dry granular form and contains a molecular proportion of water between 2.0 and 2.5, water in excess of 2.0 being interparticulate. A typical hold-up period for the aging stop is about one hour. The dry granular material passes from the screw conveyor 11 to a granulator 13 and is collected in a container 14 ready for dehydration and subsequent reduction to UO$_2$ in a fluidised bed in known manner.

Hydrated uranium trioxide produced by the described method is of low bulk density and on dehydration by nitrogen, for example and reduction by hydrogen, for example, there is produced a uranium dioxide which is highly reactive on hydrofluorination.

By suitable control of the conditions for production of the hydrated uranium trioxide, a product can be obtained which renders the subsequent reduction reaction to uranium dioxide an endothermic one, which is advantageous in that control of the reduction reaction is facilitated by the more controllable supplying of heat rather than having to remove heat.

It is considered that the total hold-up necessitated by hydration of uranium trioxide can be limited to a period of 1 to 2 hours, and that such hold-up will be much more than repayed by the reduction of the time taken for hydrofluorination of the more reactive uranium dioxide obtained from the hydrated uranium trioxide.

The following figures illustrate the advantages to be gained both in reduction and hydrofluorination by employing UO$_3$ treated as hereinbefore described instead of UO$_3$ direct from thermal denitration, the figures being the results of laboratory, not production, scale runs:

| Material | Time for reduction to 99% UO$_2$ at 500° C., minutes | Time for hydrofluorination to 99%, minutes | |
|---|---|---|---|
| | | 400° C. | 500° C. |
| UO$_3$ direct from thermal denitration | 181 | 175 | 176 to 97% |
| UO$_3$ treated by the described method | 75 | 54 | 58 |

The figures also show that UO$_3$ treated according to the described method is also less susceptible to deactivation than non-treated UO$_3$, hydrofluorination of treated UO$_3$ at the higher temperature taking very little longer whilst with non-treated UO$_3$ approximately the same time of hydrofluorination as at the lower temperature produced only 97%, it being well established that the rate of hydrofluorination falls off rapidly for the last few percent.

We claim:

1. A method of producing uranium dioxide in suitable form for fluidized bed hydrofluorination and having a high reactivity towards hydrogen fluoride, comprising subjecting uranium trioxide to hydration by mixing the uranium trioxide in powder form with water at about 80° C. to form a paste, the amount of water being slightly in excess of the stoichiometric amount required for forming uranium trioxide dihydrate, maintaining said paste at about 80° C. until a dry granular solid of uranium trioxide hydrate is produced, whereby formation of a hard mass is avoided, and dehydrating and reducing the hydrated uranium trioxide to give uranium dioxide, the uranium trioxide hydrate being in suitable form for dehydration and reduction by fluidized bed means.

2. A method according to claim 1, wherein the uranium trioxide power is mixed at high speed for about 20 minutes with the water so as to bring the water into intimate contact with the particles of uranium trioxide, and the resulting paste is dried and then aged at about 80° C. for about one hour to produce a dry granular solid of uranium trioxide hydrate for subsequent dehydration and reduction.

3. A method according to claim 2 wherein said dry granular solid of uranium trioxide hydrate has a molecular proportion of water of from 2.0 to 2.5, water in excess of 2.0 being interparticulate.

References Cited by the Examiner

CF51–10–133, pp. 18–22, Oct. 16, 1951, declassified Apr. 2, 1957. AEC Document.

AEC Document, BMI 1009, pp. 8–17, June 16, 1955 declassified Feb. 28, 1957.

"2nd Geneva Conference on Peaceful Uses of Atomic Energy," vol. 4, Sept. 1958, articles by Melvanin, pp. 133–138 and Arnold et al. pp. 139–152.

AEC Document, NLCO 718, pp. 13–15, 17–20, 22–31, 33–39, 43, 48–50, 54–57, July 21, 1959.

CARL D. QUARFORTH, *Primary Examiner*.